US012774228B2

(12) United States Patent
Zhang et al.

(10) Patent No.: US 12,774,228 B2
(45) Date of Patent: Oct. 27, 2026

(54) SOLID, NON-PHOSPHOROUS, SCALE AND CORROSION INHIBITOR COMPOSITION FOR COOLING WATER TREATMENT

(71) Applicant: Ecolab USA Inc., Saint Paul, MN (US)

(72) Inventors: Xiao Zhang, Shanghai (CN); Bingzhi Chen, Naperville, IL (US); Ning Jin, Shanghai (CN)

(73) Assignee: Ecolab USA Inc., Saint Paul, MN (US)

( * ) Notice: Subject to any disclaimer, the term of this patent is extended or adjusted under 35 U.S.C. 154(b) by 656 days.

(21) Appl. No.: 17/944,698

(22) Filed: Sep. 14, 2022

(65) Prior Publication Data

US 2023/0087114 A1 Mar. 23, 2023

Related U.S. Application Data

(60) Provisional application No. 63/243,927, filed on Sep. 14, 2021.

(51) Int. Cl.

*C02F 1/66* (2023.01)
*C02F 1/68* (2023.01)
*C02F 5/12* (2023.01)
*C08L 33/02* (2006.01)
*C02F 5/10* (2023.01)
*C02F 103/02* (2006.01)

(52) U.S. Cl.

CPC ................ *C02F 1/66* (2013.01); *C02F 1/688* (2013.01); *C02F 5/125* (2013.01); *C08L 33/02* (2013.01); *C02F 5/10* (2013.01); *C02F 2103/023* (2013.01); *C02F 2209/06* (2013.01); *C02F 2303/08* (2013.01); *C02F 2303/22* (2013.01)

(58) Field of Classification Search

None

See application file for complete search history.

(56) References Cited

U.S. PATENT DOCUMENTS

| | | | | |
|---|---|---|---|---|
| 4,673,527 | A | 6/1987 | Goudy, Jr. et al. | |
| 5,034,155 | A | 7/1991 | Soeder et al. | |
| 5,741,433 | A | 4/1998 | Mitchell et al. | |
| 5,976,414 | A | 11/1999 | Bedford et al. | |
| 6,010,639 | A | 1/2000 | Mitchell et al. | |
| 6,468,470 | B1 | 10/2002 | Oldsberg et al. | |
| 6,572,789 | B1 | 6/2003 | Yang et al. | |
| 6,607,694 | B1 | 8/2003 | Blakemore et al. | |
| 6,685,840 | B2 | 2/2004 | Hatch | |
| 6,840,251 | B2 | 1/2005 | Gill et al. | |
| 6,878,309 | B2 | 4/2005 | Blakemore et al. | |
| 7,883,638 | B2 | 2/2011 | Sundaram et al. | |
| 8,894,897 | B2 | 11/2014 | Stolte et al. | |
| 9,090,495 | B2 | 7/2015 | Haag et al. | |
| 9,441,190 | B2 | 9/2016 | Henderson et al. | |
| 10,287,482 | B2 | 5/2019 | Ferm et al. | |
| 10,590,282 | B2 | 3/2020 | Balasubramanian et al. | |
| 10,640,473 | B2 | 5/2020 | Gill et al. | |
| 10,765,999 | B2 | 9/2020 | Rao et al. | |
| 2003/0111645 | A1 | 6/2003 | Kughn et al. | |
| 2003/0141258 | A1 | 7/2003 | Hatch | |
| 2005/0011839 | A1 | 1/2005 | Dart et al. | |
| 2005/0244315 | A1 | 11/2005 | Greaves et al. | |
| 2006/0000495 | A1 | 1/2006 | Brown | |
| 2009/0294725 | A1 | 12/2009 | Sundaram et al. | |
| 2010/0183738 | A1 | 7/2010 | Kramer et al. | |
| 2015/0118103 | A1 * | 4/2015 | Erickson | C23F 11/144 422/7 |
| 2015/0125544 | A1 | 5/2015 | Henderson et al. | |
| 2015/0126425 | A1 | 5/2015 | Henderson et al. | |
| 2020/0239338 | A1 * | 7/2020 | Moloney | C23F 11/141 |
| 2023/0096673 | A1 * | 3/2023 | Dhawan | C23F 11/173 422/9 |

FOREIGN PATENT DOCUMENTS

| | | | |
|---|---|---|---|
| AU | 2012293673 | B2 | 2/2017 |
| CA | 2191540 | C | 10/2001 |
| CN | 1204623 | A | 1/1999 |
| CN | 1470464 | A | 1/2004 |
| CN | 1565992 | A | 1/2005 |
| CN | 101028957 | A | 9/2007 |
| CN | 101381170 | A | 3/2009 |
| CN | 101613599 | A | 12/2009 |
| CN | 102730852 | A | 10/2012 |
| CN | 103332797 | A | 10/2013 |
| CN | 103395897 | A | 11/2013 |
| CN | 104528966 | A | 4/2015 |
| CN | 104609579 | A | 5/2015 |
| CN | 104787904 | A | 7/2015 |
| CN | 104803493 | A | 7/2015 |

(Continued)

OTHER PUBLICATIONS

Machine translation of CN-112047498-A, pp. 1-8. (Year: 2020).*
Machine translation of CN-111439853-A, pp. 1-7/ (Year: 2020).*
Baiqing et al., "Performance and mechanism of a water stabilizer for low hardness cooling water," Anti-Corrosion Methods and Materials, vol. 50, No. 5, Oct. 1, 2003, pp. 347-351.
Boley, "Field Observations of Effective Fouling and Corrosion Control in Open Recirculating Cooling Systems," NACE Papers, Mar. 1979, pp. 12-16, Abstract only.

(Continued)

*Primary Examiner* — Clare M Perrin

(74) *Attorney, Agent, or Firm* — Fredrikson & Byron, P.A.

(57) ABSTRACT

A solid, non-phosphorus water treatment composition can be used for cooling water treatment applications. The composition can include a polycarboxylic acid, a polymeric dispersant, a soluble corrosion inhibitor, and a fluorescent tracer. The composition can define a solid that is devoid of phosphorus and has a pH effective such that, when the composition is dissolved in water at a concentration of 2 weight percent to form a solution, the solution has a pH within a range from 1 to 5.

22 Claims, No Drawings

(56) References Cited

FOREIGN PATENT DOCUMENTS

| | | | | | |
|---|---|---|---|---|---|
| CN | 104478104 | B | | 3/2016 | |
| CN | 105502704 | A | | 4/2016 | |
| CN | 105502705 | A | | 4/2016 | |
| CN | 105621633 | A | | 6/2016 | |
| CN | 105776588 | A | | 7/2016 | |
| CN | 105967355 | A | | 9/2016 | |
| CN | 106745835 | A | | 5/2017 | |
| CN | 106745837 | A | | 5/2017 | |
| CN | 106745838 | A | | 5/2017 | |
| CN | 107226538 | A | | 10/2017 | |
| CN | 107364979 | A | | 11/2017 | |
| CN | 107400185 | A | | 11/2017 | |
| CN | 107572670 | A | | 1/2018 | |
| CN | 107698043 | A | | 2/2018 | |
| CN | 107857375 | A | | 3/2018 | |
| CN | 107963731 | A | | 4/2018 | |
| CN | 109231504 | A | | 1/2019 | |
| CN | 109264877 | A | | 1/2019 | |
| CN | 106011868 | B | | 2/2019 | |
| CN | 110127866 | A | | 8/2019 | |
| CN | 111439853 | A | * | 7/2020 | ............. C02F 5/125 |
| CN | 112047498 | A | * | 12/2020 | |
| DE | 10102900 | A1 | | 7/2002 | |
| EP | 3161184 | A1 | | 5/2017 | |
| EP | 3328800 | A1 | | 6/2018 | |
| EP | 3046948 | B1 | | 11/2018 | |
| FR | 2213236 | A1 | | 8/1974 | |
| GB | 1079275 | A | | 8/1967 | |
| GB | 2511491 | A | | 9/2014 | |
| IN | 33/2012 | A | | 8/2012 | |
| IN | 106277375 | A | | 1/2017 | |
| IN | 107304077 | A | | 10/2017 | |
| JP | S56121693 | A | | 9/1981 | |
| JP | S62193698 | A | | 8/1987 | |
| JP | H09299961 | A | | 11/1997 | |
| JP | 2002316193 | A | | 10/2002 | |
| PL | 106037 | B1 | | 11/1979 | |
| WO | 02083289 | A2 | | 10/2002 | |
| WO | 03018487 | A1 | | 3/2003 | |
| WO | 2005079578 | A2 | | 9/2005 | |
| WO | 2005110574 | A2 | | 11/2005 | |
| WO | 2011116518 | A1 | | 9/2011 | |
| WO | 2013092780 | A1 | | 6/2013 | |
| WO | 2015009955 | A1 | | 1/2015 | |
| WO | 2015069684 | A2 | | 5/2015 | |
| WO | 2018022139 | A1 | | 2/2018 | |
| WO | 2018040097 | A1 | | 3/2018 | |
| WO | 2019046409 | A1 | | 3/2019 | |
| WO | 2019213483 | A1 | | 11/2019 | |
| WO | 2020047015 | A1 | | 3/2020 | |
| WO | 2020159955 | A1 | | 8/2020 | |
| WO | 2020214196 | A1 | | 10/2020 | |

OTHER PUBLICATIONS

Chen, "A Robust Non-Phosphorus Corrosion and Scale Control Program for Cooling Systems," Presented at the 2018 Cooling Technology Institute Annual Conference, Houston, TX, Feb. 4-8, 2018, 20 pages.

Choudhury et al., "Corrosion management in power plant cooling systems using tertiary-treated municipal wastewater as makeup water," Corrosion Science, vol. 61, Aug. 2012, pp. 231-241, Abstract only.

Cusdin et al., "Underdeposit corrosion in reactor jackets. Improved zinc treatment program offers a solution," O&C, Tijdschrift voor Oppervlaktetechnicken en Corrosiebestrijding, vol. 34, No. 8, 1990, pp. 336-339, Abstract only.

Feng et al., "How to solve the problem of pitting on condenser of zinc powder furnace caused by cooling water," Gongye Yongshui Yu Feishui, vol. 33, No. 1, 2002, pp. 20-30, Abstract only.

Galegher et al., "Pilot-Scale Treatment and Cooling Tower Reuse of Gasification Wastewater," Western Synfuels Symposium Proceedings, 1985, pp. 66-76, Abstract only.

Kunz, "Corrosion of Zinc in Cooling Water," NACE International, 1990, Paper No. 348, Abstract only.

Liu et al., "A non-phosphorus water treatment agent in water injection system: inhibiting strontium sulfate and dispersing ferric oxide," Water Supply, vol. 17, No. 2, Mar. 2017, pp. 352-361, Abstract only.

Ou et al., "A synergistic effect of sodium gluconate and 2-phosphonobutane-1,2,4-tricarboxylic acid on the inhibition of CaCO3 scaling formation," Powder Technology, vol. 302, Nov. 2016, pp. 160-167, Abstract only.

Wang et al., "Study of organic phosphonocarboxylic acids as water stabilizing agent. I. Corrosion and scale inhibition by 2-phosphonobutane-1,2,4-tricarboxylic acid," Huadong Huagong Xueyuan Xuebao, vol. 15, No. 5, 1989, pp. 605-614, Abstract only.

Xie et al., "A Novel Non-Phosphorous Cooling Water Treatment Program with Robust Scaling and Corrosion Control," NACE International, Paper No. 13009, 2019, 14 pages.

International Patent Application No. PCT/US2022/043468, International Search Report and Written Opinion mailed Jan. 3, 2023, 12 pages.

* cited by examiner

SOLID, NON-PHOSPHOROUS, SCALE AND CORROSION INHIBITOR COMPOSITION FOR COOLING WATER TREATMENT

CROSS REFERENCE

This application claims the benefit of U.S. Provisional Patent Application No. 63/243,927, filed Sep. 14, 2021, the entire contents of which are incorporated herein by reference.

TECHNICAL FIELD

This disclosure relates to treatment compositions for water systems and, more particularly, to phosphorous-free treatment compositions for cooling water systems.

BACKGROUND

Cooling water systems are commonly used to cool process fluids through heat exchangers or condensers in various plants. The heat exchangers or condensers can be corroded or have scale or biofilm growth due to poor water management. The corrosion, scale, and biofilm growth on heat exchangers can lead to a significant reduction in heat exchanger efficiency and operating life. For these and other reasons, operators of cooling water systems may utilize chemical treatment programs to help prevent scale formation, microorganism formation, sludge, and/or corrosion.

Inexpensive inorganic phosphates are often used in cooling water treatment programs. This includes the use of orthophosphates as anionic corrosion inhibitors and complex phosphates as cathodic inhibitors. Orthophosphates, when used, are often supplied in the form of phosphoric acid or one of its sodium or potassium salts.

While phosphate-containing treatments can help effectively manage water-containing systems, phosphates are a key nutrient for micro-organisms, such as cyanobacteria and algae. Phosphorus is recognized as the primary growth-limiting nutrient for algae in surface water bodies, including lakes and rivers. Excessive biomass growth due to phosphorus nutrients in lakes and rivers can cause reduced light penetration, organic growth degradation, and subsequent depletion of oxygen in the water. To help counteract these issues, regional and national governments have promulgated increasingly strict phosphorus discharge restrictions.

SUMMARY

In general, this disclosure relates to solid, non-phosphorous water treatment compositions and associated techniques for using such compositions to treat water, e.g., in a recirculating water system. The water treatment compositions can inhibit the formation of scale and corrosion deposits on surfaces contacted by the treated water source. The water treatment compositions are formulated from phosphorous-free constituent ingredients, allowing the water treatment compositions to be added to a source water without increasing the phosphorous concentration of the source water. This is beneficial for maintaining compliance with phosphorous discharge regulations when the treated water source is subsequently discharged, e.g., to a surface water body such as a river or lake.

The phosphorous-free water treatment compositions of the disclosure are specifically formulated to facilitate formation of a solid treatment composition. In other word, the water treatment composition is provided as a solid phase composition. The solid water treatment composition can be introduced onsite into a source water using a dispenser. The dispenser may or may not size reduce and/or dissolve the solid treatment composition with a diluent prior to introducing the treatment composition in the source water intended to be treated. Configuring the phosphorous-free water treatment composition as a solid can reduce the volume of the composition compared to utilizing a liquid formulation, making transportation and storage of the solid treatment composition easier and more economical that a comparable liquid formulation.

The solid, phosphorous-free water treatment composition can exhibit excellent dimensional stability over a range of storage conditions, including comparatively high temperature and humidity conditions, for the duration of an expected storage period. Furthermore, the solid, phosphorous-free water treatment composition can exhibit substantially complete solubility in water, ensuring that the solid, phosphorous-free water treatment composition is substantially fully solubilized in the source water to which the composition is added.

The solid, non-phosphorus water treatment composition may include one or more of a cathodic corrosion inhibitor, an anodic corrosion inhibitor, a film-forming corrosion inhibitor, a scale inhibitor, a dispersant, a fluorescent reagent to control concentration of active reagents, a pH regulator to ensure all ingredients remain soluble in dispensed solution, a perseverative to prevent microorganism growth in dispensed solution, and/or a filler reagent to help solid block formation. Certain constituent ingredients may perform multiple of the foregoing described functionalities.

For example, the solid, non-phosphorus water treatment composition may be formulated to include a polycarboxylic acid, a polymeric dispersant, a soluble corrosion inhibitor, and a fluorescent tracer. The water treatment composition can optionally have one or more additional constituent ingredients, such as pH regulator, filler/binder, and/or biocide. In some implementations, a constituent ingredient may perform multiple functions within the composition, such as a pH regulator and filler. The solid, non-phosphorus water treatment composition can be pH-controlled, e.g., to provide a resultant solution upon dissolution of the water treatment composition having a threshold pH. The pH of the solid, non-phosphorus water treatment composition can be pH-controlled in a variety of ways, such as through the selection and incorporation of one or more acidified constituent components in the formulated water treatment composition and/or through the incorporation of one or more pH regulating components in the composition that function to modify the pH of the resultant solution formed from the solid composition.

In some implementations, the solid, non-phosphorus water treatment composition is pH controlled to generate a resultant solution having a pH within a range from about 1 to about 5, when the solid composition is dissolved at a concentration of 2 weight percent. For example, the solid, non-phosphorus water treatment composition may be pH controlled to generate a resultant solution having a pH within a range from about 2 to about 4. Without wishing to be bound by any particular theory, it is believed that controlling the pH of the non-phosphorous water treatment composition to a target acidified range can help provide an efficacious solid, non-phosphorous water treatment composition. Controlling the pH of the composition can help the solid composition maintain structure and dimensional stability prior to use, preventing premature disintegration of the solid, and also facilitate substantially complete dissolvability of the composition in water during use.

In some implementations, the solid, non-phosphorus water treatment composition is formulated to provide a resultant solution having a pH sufficiently low to ensure substantially complete dissolution of the composition in water. If the pH of the resultant solution is above an upper threshold, the solution may exhibit cloudiness, indicating incomplete dissolution of the treatment composition. Portions of the solid water treatment composition not sufficiently dissolved in the water to be treated may be unavailable for imparting treatment functionality to the water, resulting in under treatment of the water and/or wasted treatment composition. In some implementations, the solid, non-phosphorus water treatment composition is formulated to provide a resultant solution having a pH sufficiently high to help prevent the formation of pH-associated deposits, such as low-pH corrosion formation, and/or provide a sufficiently safe resultant solution for personnel in the water handling facility.

In one example, a solid, non-phosphorus water treatment composition suitable for use in cooling water treatment is described. The composition includes a polycarboxylic acid ranging from 30 weight percent to 60 weight percent of the composition, a polymeric dispersant ranging from 15 weight percent to 30 weight percent of the composition, a soluble corrosion inhibitor ranging from 2 weight percent to 25 weight percent of the composition; and a fluorescent tracer. The example specifies that the composition defines a solid, is devoid of phosphorus, and has a pH effective such that, when the composition is dissolved in water at a concentration of 2 weight percent to form a solution, the solution has a pH within a range from 1 to 5.

In another example, a solid, non-phosphorus water treatment composition for cooling water treatment is described. The composition includes a polycarboxylic acid ranging from 30 weight percent to 60 weight percent of the composition, a polymeric dispersant ranging from 15 weight percent to 30 weight percent of the composition, a soluble corrosion inhibitor ranging from 2 weight percent to 25 weight percent of the composition, a fluorescent tracer, and a pH regulator. The example specifies that the composition defines a pressed solid, is devoid of phosphorus, has a pH effective such that, when the composition is dissolved in water at a concentration of 2 weight percent to form a solution, the solution has a pH within a range from 2.5 to 4, and has a substantially uniform distribution of constituent components across an entirety of the composition.

In another example, a method of treating a cooling water system is described. The method includes adding a solid, non-phosphorus water treatment composition to a water source to form a solution. The solid, non-phosphorus water treatment composition includes a polycarboxylic acid ranging from 30 weight percent to 60 weight percent of the composition, a polymeric dispersant ranging from 15 weight percent to 30 weight percent of the composition, a soluble corrosion inhibitor ranging from 2 weight percent to 25 weight percent of the composition, and a fluorescent tracer. The example specifies that forming the solution comprises forming a solution having a pH within a range from 1 to 5. The example method also involves applying the solution within a water containing system.

The details of one or more examples are set forth in the description below. Other features, objects, and advantages will be apparent from the description, and from the claims.

DETAILED DESCRIPTION

As used herein, the term "water" for treatment according to the invention includes a variety of sources, such as freshwater, pond water, sea water, salt water or brine source, recycled water, or the like. The term water is also understood to optionally include both fresh and recycled water sources, as well as any combination of waters for treatment according to the compositions of the disclosure. In some embodiments, recycled water refers to a mixture of water that comprises both water recycled from previous use (e.g., previous cycles of thermal exchange as a heat transfer medium) and water that has not been used in previously used (e.g., in cycles of thermal exchange as a heat transfer medium), such as, e.g., fresh water, pond water, sea water, etc.

The term "non-phosphorous," "phosphorous free," and various thereof means, as used herein, means no more than a trace amount of phosphorous is present in the composition, particularly less than 0.1 wt %, such as less than 0.05 wt %, less than 0.01 wt %, or less than 0.001 wt %.

The term "weight percent," "-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt %," etc.

As used herein, the term "about" modifying, for example, the quantity of an ingredient in a composition, concentration, and like values, and ranges thereof, employed in describing embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture.

The present disclosure generally relates to non-phosphorous water treatment compositions that are provided in solid phase and used to treat aqueous systems to inhibit the formation of scale and corrosion deposits in the aqueous system. The aqueous system to be treated with the treatment composition may typically be a cooling water system that supplies water to one or more processes in which thermal energy from a comparatively hot process stream is transferred to a comparatively cool water stream via a divided heat exchange surface. In some implementations, a water treatment composition according to the disclosure can be used in an open circulating cooling water system, such as an open circulating cooling water system that includes one or more cooling towers that cool water via evaporative cooling.

The solid, non-phosphorus water treatment composition may generally include a polycarboxylic acid, a polymeric dispersant, and a soluble corrosion inhibitor. The polycarboxylic acid may function as a scale inhibitor. The soluble corrosion inhibitor may be a cathodic corrosion inhibitor, an anodic corrosion inhibitor, a combined cathodic and anodic corrosion inhibitor (e.g., bipolar film), and/or film-forming inhibitor, in each case soluble in water. The composition may also include a fluorescent tracer for tracking and controlling the amount of treatment chemistry in the water system being treated. Various additional constituent components can be included in the water treatment composition such as a pH regulator and/or filler, a biocide, and the like. Each of the components included in the water treatment composition can be free of phosphorous. As a result, an entirety of the solid water treatment composition may be phosphorous free.

Each of the constituent components of the water treatment composition can be provided in solid form and admixed together. After mixing and formation of the resulting solid, non-phosphorus water treatment composition, the composition may be chemically homogenous throughout the solid. In other words, each portion of the solid water treatment composition may have the same constituent components in substantially the same relative weight percentages as each other portion of the solid water treatment composition.

The solid water treatment composition according to the disclosure includes at least one solid, non-phosphorous polycarboxylic acid as a scale inhibitor. In different implementations, the water treatment composition may include a single solid, non-phosphorous polycarboxylic acid or may include a mixture of two or more solid, non-phosphorous polycarboxylic acids. The polycarboxylic acid component of the water treatment composition can comprise from about 25 wt % to about 70 wt %, such as from about 30 wt % to about 60 wt %, from about 30 wt % to about 40 wt %, from about 40 wt % to about 50 wt %, or from about 50 wt % to about 60 wt % of the water treatment composition based on the total weight of the water treatment composition.

The polycarboxylic acid component may be a carboxylic acid or a residue of a molecule having at least two carboxyl moieties, e.g., dicarboxylic acids, tricarboxylic acids, tetracarboxylic acids. In some examples, the polycarboxylic acid component is a copolymer. The copolymer may comprise, consist essentially of, or consist of a polymerized residue of two or more monomers. The two or more monomers may include a first monomer comprising, consisting essentially of, or consisting of a carboxylic acid or a residue thereof and a second monomer different than the first monomer. The first monomer may include a carboxylic acid or a residue of a molecule having at least one carboxyl moiety, a salt thereof, or a conjugate base thereof. The carboxylic acid may include a single carboxyl moiety or a plurality of carboxyl moieties (e.g., dicarboxylic acids such as maleic acid, etc.).

As employed herein, the term "copolymer" refers to polymers formed from two, three or more monomers and polymers having two, three or more differing subunits in their polymer backbone. The present compositions may include (meth)acrylic polymers, e.g., acrylic acid homopolymers, methacrylic acid homopolymers, and/or copolymers formed from mixtures including these two monomers.

Suitable carboxylic acids for use as the carboxylic acid component of the water treatment composition may comprise, consist essentially of, or consist of, by way of example, dicarboxylic acids such as maleic acid or maleic anhydride, fumaric acid, itaconic acid; glutaconic acid, muconic acid, succinic acid, or any other unsaturated dicarboxylic acid or anhydride thereof; tricarboxylic acids or greater, such as citric acid, aconitic acid, or any other carboxylic acid having three or more carboxylic acid moieties; or any other monomers having at least two carboxylic acid moieties.

In some examples, the carboxylic acid component is a copolymer that may comprise, consist essentially of, or consist of a polymerized residue of two or more monomers. The two or more monomers may include at least one monomer comprising, consisting essentially of, or consisting of a carboxylic acid or a residue thereof and a second monomer different that the first monomer. Suitable carboxylic acids for use as the first monomer may comprise, consist essentially of, or consist of, by way of example, an alkyl acrylic acid such as methacrylic acid, a butenoic acid (e.g., crotonic acid), a pentenoic acid, propenoic acid, or any other unsaturated monocarboxylic acid capable of polymerizing; dicarboxylic acids such as maleic acid or maleic anhydride, fumaric acid, itaconic acid; glutaconic acid, muconic acid, succinic acid, or any other unsaturated dicarboxylic acid or anhydride thereof capable of polymerizing; tricarboxylic acids or greater, such as citric acid, aconitic acid, or any other carboxylic acid having three or more carboxylic acid moieties; or any other monomers having at least one carboxyl moiety; a salt of any of the foregoing, or a conjugate base of any of the foregoing. In some embodiments, the first monomer is formed from one of any of the foregoing carboxylic acids, a salt thereof, or a conjugate base thereof. For example, the first monomer may include a carboxylate (e.g., dicarboxylate) of any of the foregoing carboxylic acids.

Specific examples of polycarboxylic acids that may be commonly used as the polycarboxylic acid of the solid water treatment composition include a polyacrylic acid (PAA), a polyacrylamide, an acrylamidomethyl propane sulfonate/acrylic acid copolymer (AMPS/AA), a polymaleic acid/acrylic acid copolymer (MA/AA), a polymaleic acid/acrylic acid/acrylamidomethyl propane sulfonate terpolymer (PMA/AA/AMPS), hydrolyzed polymaleic anhydride, maleic acid-acrylic acid copolymer, acrylic acid-hydroxypropyl acrylate copolymer, butanetetracarboxylic acid, acrylamidosulfonic acid (AMPS), sodium styrenesulfonate (SSS), and/or sulfophenylmethallyl ether (SPME).

In some implementations, a polyaspartic acid (PASP) compound is used as the polycarboxylic acid component in the solid water treatment composition. The term "polyaspartic acid" refers to copolymers in which the mole percent of the aspartic acid residues is at least about 20% of the total number of subunits in the polymer, such as at least about 60%, at least about 70%, or at least about 80% of the total number of subunits in the polyaspartic acid compound. In some examples, at least about 80% of the subunits of the polyaspartic acid are alpha- and/or beta-aspartic acid subunits. For example, the proportion of aspartic acid subunits in the beta-form may be more than about 50%, such as more than 70%.

In addition to having polyaspartic acid units, a polyaspartic acid may also include other repeating units, e.g. malic acid subunits, maleic acid subunits, and/or fumaric acid subunits. In some embodiments, the polyaspartic acid may also include a minor amount (typically no more than about 20% and commonly no more than about 10% of the subunits) of the subunits of the polymer based on one or more co-monomers, such as glutamic acid, polybasic carboxylic acids, fatty acids, polybasic hydroxycarboxylic acids, monobasic polyhydroxycarboxylic acids, and sugar carboxylic acids.

Other examples of polyaspartic acid compounds include copolymers of polyaspartic acid produced by reacting maleic acid, a polycarboxylic acid, ammonia and a polyamine and hydrolyzing and converting the resultant polymer into a salt with an alkali hydroxide. Suitable polycarboxylic acids for use in such a process include adipic acid, citric acid, fumaric acid, malic acid, malonic acid, succinic acid, glutaric acid, oxalic acid, pimelic acid, itaconic acid, nonanedioic acid, dodecanedioic acid, octanedioic acid, isophthalic, terphthalic and phthalic acid. Suitable polyamines typically include at least one primary amino group, e.g., polyamines such as diethylene triamine, polyoxyalkyleneamine diamines and triamines, melamine, alkyl diamines (e.g., ethylene diamine and hexanediamine) and alkyl triamines.

The solid water treatment composition according to the disclosure includes at least one solid, non-phosphorous polymeric dispersant. In some embodiments, the polymeric dispersant also includes a carboxylic acid moiety, with the polymeric dispersant component of the solid water treatment composition being different than the separate carboxylic acid component of the composition. The polymeric dispersant component of the water treatment composition can comprise from about 10 wt % to about 40 wt %, such as from about 15 wt % to about 30 wt %, from about 15 wt % to about 20 wt %, or from about 20 wt % to about 30 wt % of the water treatment composition based on the total weight of the water treatment composition.

In general, polymeric dispersants are highly charged polymers that help prevent small particles from agglomerating into larger masses, which settle out on surfaces more easily. The mechanism of dispersion can be by charge reinforcement or steric stabilization. Dispersion by charge reinforcement increases negative electrical charge that all particles in solution have. For example, low molecular weight anionic polymers adsorb onto the surface of particles in water increasing the negative charge of the particle. Increases surface charge helps prevent agglomeration and settling of the solids. Adsorbed polymers on the surface of the particles also helps prevent agglomeration by creating a physical barrier to other particles. This barrier actions like an elastic cushion that helps prevent the particles from sticking together and is a steric effect, dependent on the structure and molecular weight of the adsorbed polymer.

A non-phosphorous polymeric dispersant may function through both electrostatic repulsion and steric stabilization. Some polymeric dispersants may function as a dispersant to prevent deposition of suspended material without providing significant scale inhibition; other polymers functioning as the polymeric dispersant may provide both scale inhibition and dispersant functionality.

In some implementations, the polymeric dispersant is a copolymer that is a polymerized residue of two or more monomers, one of which is a carboxylic acid or a residue thereof and a second of which is a sulfonated acid or a residue thereof. The first monomer may include a carboxylic acid or a residue of a molecule having at least one carboxyl moiety, a salt thereof, or a conjugate base thereof. The carboxylic acid may include a single carboxyl moiety or a plurality of carboxyl moieties (e.g., dicarboxylic acids such as maleic acid, etc.). Suitable carboxylic acids for use as the first monomer may comprise, consist essentially of, or consist of, by way of example, an alkyl acrylic acid such as methacrylic acid, a butenoic acid (e.g., crotonic acid), a pentenoic acid, propenoic acid, or any other unsaturated monocarboxylic acid capable of polymerizing; dicarboxylic acids such as maleic acid or maleic anhydride, fumaric acid, itaconic acid; glutaconic acid, muconic acid, succinic acid, or any other unsaturated dicarboxylic acid or anhydride thereof capable of polymerizing; tricarboxylic acids or greater, such as citric acid, aconitic acid, or any other carboxylic acid having three or more carboxylic acid moieties; or any other monomers having at least one carboxyl moiety; a salt of any of the foregoing, or a conjugate base of any of the foregoing.

The first monomer may constitute about 55 mol % of the copolymer or more, such as about 55 mol % to about 99 mol %, about 60 mol % to about 98 mol %, about 70 mol % to about 95 mol %, about 80 mol % to about 99 mol %, about 90 mol % to about 97 mol %, about 93 mol % to about 99 mol %, about 96 mol % to about 99 mol %, about 92 mol % to about 94 mol %, about 83 mol % to about 87 mol %, about 88 mol % to about 92 mol %, about 93 mol % to about 96 mol %, about 95 mol % to about 98.5 mol %, about 60 mol %, about 70 mol %, about 80 mol %, about 85 mol %, about 90 mol %, about 92.9 mol %, about 93.3 mol %, about 95 mol %, about 96 mol %, about 96.4 mol %, about 98.4 mol %, or about 98.5 mol % of the copolymer or less.

The second monomer of the copolymer comprises, consists essentially of, or consists of a sulfonated acid or a residue thereof. The sulfonated acid may include a sulfonated acid moiety, a salt thereof, or a conjugate base thereof. Suitable sulfonated acids may include ATBS, sulfostyrene, vinylsulfonic acid, methallylsulfonic acid, a salt of the foregoing (e.g., sodium methallyl sulfonate or ATBS sodium salts), or a conjugate base of the foregoing (e.g., methallyl sulfonate).

The second monomer may constitute about 45 mol % of the copolymer or less, such as about 0.01 mol % to about 45 mol %, about 1 mol % to about 40 mol %, about 20 mol % to about 30 mol %, about 0.01 mol % to about 15 mol %, about 0.01 mol % to about 10 mol %, about 0.01 mol % to about 5 mol %, about 2 mol % to about 4 mol %, about 1 mol % to about 5 mol %, about 5 mol % to about 15 mol %, about 10 mol % to about 15 mol %, about 5 mol % to about 10 mol %, about 18 mol % to about 22 mol %, about 13 mol % to about 17 mol %, about 8 mol % to about 12 mol %, about 3 mol % to about 7 mol %, about 2 mol %, about 3 mol %, about 3.6 mol %, about 3.7 mol %, about 4 mol %, about 5 mol %, about 10 mol %, about 15 mol %, about 20 mol %, about 20 mol % or less, or about 10 mol % of the copolymer or less.

As one specific example, the solid, non-phosphorous polymeric dispersant may be a copolymer of acrylic acid and 2-acrylanmido-2-methylpropanesulfonic acid (AA-AMPS). Other example solid, non-phosphorous polymeric dispersants that can be used include polyepoxysuccinic acid and/or a copolymer of maleic and acrylic acid (MA/AA). In various examples, the solid, non-phosphorous polymeric dispersant may include a terpolymer and/or a tetrapolymer.

The solid water treatment composition according to the disclosure can also include at least one solid, non-phosphorous water-soluble corrosion inhibitor. In general, corrosion inhibitors protect the metal through formation of a passivation layer on the metal surface. The passivation layer wets the metal surface, which in turn prevents contact of the metal from the corrosive nature of the fluids. Typically, corrosion inhibitor formulations may contain a variety of aliphatic organic surfactant molecules including amines, quaternary amines, imidazolines, amides, carboxylic acids, or combinations thereof.

Example corrosion inhibitors that may be used in the solid, non-phosphorous water treatment composition include an azole (e.g., triazole), zinc salts, molybdate salts, and combinations therefore. Specific example azoles include benzotriazole, tolyltriazole, and mercaptobenzothiazole. Specific example zinc salts include zinc chloride, zinc sulfate and zinc nitrate. Specific example molybdate salts include alkaline earth metal molybdates, such as sodium molybdate.

In some implementations, the corrosion inhibitor is, or includes, a substituted and/or hydrogenated benzotriazoles and tolyltriazoles. For example, the corrosion inhibitor can include an alkyl benzotriazole, an alkyl tolyltriazole, an alkoxy benzotriazole, an alkoxy tolyltriazole, a nitro benzotriazole, a nitro tolyltriazole, a halo benzotriazole, a halo tolyltriazole, a hydrogenated benzotriazole, a hydrogenated tolyltriazole an acid or a salt thereof, or a combination thereof. The corrosion inhibitor does not contain phosphorus.

The alkyl or alkoxy benzotriazole can have from 1 to 6 alkyl substituents attached to a nitrogen atom of the azole or to a carbon atom of the aromatic ring and the alkyl substituents can be C1 to C12 alkyl groups. For example, the alkyl benzotriazole can comprise butyl benzotriazole, pentyl benzotriazole, hexyl benzotriazole, heptyl benzotriazole, octyl benzotriazole, or a combination thereof.

The alkyl tolyltriazole can have from 1 to 5 alkyl substituents attached to a nitrogen atom of the azole or to a carbon atom of the aromatic ring and the alkyl substituents can be C1 to C12 alkyl groups. For example, the alkyl tolyltriazole can comprise butyl tolyltriazole, pentyl tolyltriazole, hexyl tolyltriazole, heptyl tolyltriazole, octyl tolyltriazole, or a combination thereof.

The solid water treatment composition may utilize other corrosion inhibitors in addition to or in lieu of the forgoing, such as an imidazoline compound, a quaternary ammonium compound, a pyridinium compound, or a combination thereof. The imidazoline can be, for example, imidazoline derived from a diamine, such as ethylene diamine (EDA), diethylene triamine (DETA), triethylene tetraamine (TETA) etc. and a long chain fatty acid such as tall oil fatty acid (TOFA). Suitable quaternary ammonium salts include, but are not limited to, a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, or a trialkyl benzyl quaternary ammonium salt, where the alkyl group has about 6 to about 24 carbon atoms, about 10 and about 18 carbon atoms, or about 12 to about 16 carbon atoms. The quaternary ammonium salt can be a benzyl trialkyl quaternary ammonium salt, a benzyl triethanolamine quaternary ammonium salt, or a benzyl dimethylaminoethanolamine quaternary ammonium salt.

The corrosion inhibitor component of the water treatment composition can comprise from about 2 wt % to about 25 wt %, such as from about 8 wt % to about 25 wt %, from about 10 wt % to about 20 wt %, from about 10 wt % to about 15 wt %, from about 12.5 wt % to about 17.5 wt %, or from about 15 wt % to about 20 wt % of the water treatment composition based on the total weight of the water treatment composition. In one example, the solid water treatment composition includes only a single corrosion inhibitor selected from the group of a zinc-containing compound (e.g., a zinc salt), a molybdate-containing compound (e.g., a molybdate salt), and a triazole (e.g., benzotriazole, tolyltriazole). In other examples, the solid water treatment composition includes a combination of multiple corrosion inhibitors, including at least one of a zinc-containing compound (e.g., a zinc salt) and a molybdate-containing compound (e.g., a molybdate salt), and at least one triazole (e.g., benzotriazole, tolyltriazole)

For example, the solid water treatment composition may include at least one triazole ranging from 2 weight percent to 15 weight percent of the composition, such as from about 4 wt % to about 6 wt %, from about 5 wt % to about 8 wt %, or from about 10 wt % to about 12 wt %, and at least one of a zinc-containing compound and a molybdate-containing compound ranging from 2 weight percent to 15 weight percent of the composition, such as from such as from about 4 wt % to about 6 wt %, from about 5 wt % to about 8 wt %, from about 8.5 wt % to about 11.5 wt %, or from about 10 wt % to about 12 wt %.

The solid water treatment composition according to the disclosure may also include a fluorescent tracer. Inclusion of a fluorescent tracer allows the amount of the composition in the water being treated to be determined and/or monitored. This can help the operator determine how much treatment composition is being delivered in the water source and/or how much treatment composition is being exhausted during use. A fluorometer, UV spectrometer, or other fluorescent material detecting apparatus may be used to determine the amount of fluorescent tracer in a water source, and by extension, the proportional amount of water treatment composition therein. Such equipment can be used to constantly monitor the concentration of a fluorescent tracer in a system or can be used to monitor said concentrations on demand (e.g., randomly or at selected intervals).

The fluorescent tracer may be provided in the composition as a separate, solid component added to the composition and/or by adding a fluorescent tagging agent to one of the polymers discussed above. When provided as a separate component, the fluorescent tracer can comprise less than 5 wt %, such as less than 1 wt %, or less than 0.5 wt %, such as from about 0.1 wt % to about 1 wt %, or from about 0.2 wt % to about 0.8 wt % of the water treatment composition based on the total weight of the water treatment composition. When the fluorescent tracer is provided by tagging a separate functional polymeric component, the weight of the fluorescent tracer can be included as part of the weight of the separate functional polymeric component in the composition.

Example solid fluorescent tracers that may be used include 1,3,6,8-pyrenetetrasulfonic acid sodium salt, fluorescein, and naphthalene disulfonic acid sodium salt. In a specific example, the fluorescent tracer used in the solid water treatment composition is 1,3,6,8-pyrenetetrasulfonic acid sodium salt.

When a tagging agent is used, a polymeric compound is tagged (e.g., polymerized) with the tagging agent. The tagging agent can be polymerized into any of the polymers disclosed herein. Suitable tagging agents may include one or more monomers that are naphthalene-containing, anthracene-containing, quinoline-containing, isoquinoline-containing, indole-containing, pyrene-containing, benzimidazole-containing, coumarin-containing, fluorescein-containing, quinoxaline-containing, xanthylium-containing, boron-dipyrromethene-containing, bimane-containing, rhodamine-containing, or naphthalimide-containing. Specific monomers that can be used to fluorescently tag a polymer include but are not limited to 4-methoxy-N-(3-N',N'-dimethylaminopropyl)naphthalimide (quaternary salt), N-allyl-4-(2-N',N'-dimethylaminoethoxy)naphthalimide (methyl sulfate quaternary salt), 4-methoxy-N-(3-N',N'-dimethylaminopropyl) naphthalimide (allyl chloride quaternary salt), 5-allyloxy-4'-carboxy-1,8-naphthoylene-1',2'-benzimidazole, 6-Vinylbenzyloxy-4'-carboxy-1,8-naphthoylene-1',2'-benzimidazole, 4-methoxy-N-(3-N',N'-dimethylaminopropyl)naphthalimide (2-hydroxy-3-allyloxypropyl quat), quaternary ammonium salt of dimethylaminopropylmethacrylamide and 2-(chloromethyl)quinoline, quaternary ammonium salt of dimethylaminopropylmethacrylamide and 9-(chloromethyl)anthracene, quaternary ammonium salt of dimethylaminopropylmethacrylamide and 2-(chloromethyl)benzimidazole, quaternary ammonium salt of dimethylaminopropylmethacrylamide and 4-(bromomethyl) pyrene, quaternary ammonium salt of dimethylaminopropylmethacrylamide and 1-(chloromethyl) naphthalene, any additional quaternary ammonium salt of dimethylaminopropylmethacrylamide and halo-alkyl derivative of the fluorescent chromophores previously listed, or any other fluorescent molecule capable of polymerizing With any of the polymers, the tagging agent may constitute less than about 10 mol % of the polymer, such as less than about 1 mol %, less than about 0.1 mol %, or less than about 0.01 mol % of the polymer.

The solid, non-phosphorus water treatment composition according to the disclosure can be pH-controlled, e.g., to provide a resultant solution upon dissolution of the water treatment composition having a threshold pH. The pH of the solid, non-phosphorus water treatment composition can be pH-controlled in a variety of ways, such as through the selection and incorporation of one or more acidified and/or alkaline constituent components in the formulated water treatment composition and/or through the incorporation of one or more solid, non-phosphorous pH regulating components in the composition that function to modify the pH of the resultant solution formed from the solid composition. When used, the one or more solid, non-phosphorous pH regulating components may also function as a filler in the composition, e.g., increasing the volume of the water treatment composition in which the active constituent components are dispersed.

In different formulations, a pH regulating component included in the solid water treatment composition may be an acid, a base, and/or a neutral salt. The selection and relative amount of one or more pH regulating components used in the composition may vary depending on the other specific constituent components included in the composition and the solution pH provided by those other constituent components. Example pH regulating components that may be used include, but are not limited to, alkali hydroxides, alkali carbonates, alkali bicarbonates, alkaline earth metal hydroxides, alkaline earth metal carbonates, alkaline earth metal bicarbonates, alkali sulfates, alkaline earth metal sulfates, alkali bisulfates, alkaline earth metal bisulfates, alkali and/or alkaline earth metal silicates, mineral acids, sulfamic acid, and/or organic acids (e.g., lactic acid, acetic acid, formic acid, citric acid, oxalic acid, uric acid, malic acid, tartaric acid). In some implementations, one or more pH regulating components used in the composition are selected from the group consisting of an alkali sulfates, an alkaline earth metal sulfates, an alkali bisulfates, an alkaline earth metal bisulfates, sulfamic acid, an alkaline earth metal carbonate, citric acid, and combinations thereof.

The one or more pH regulating components can be provided in solid form and incorporated with the other constituent components included in the solid water treatment composition. The one or more pH regulating components may be in hydrous form or anhydrous form. Use of an anhydrous pH regulating component may be helpful to reduce the water absorbency of the resulting solid water treatment composition, which can aid the stability of the solid water treatment composition (e.g., during transport and storage).

The constituent components of the solid, non-phosphorous water treatment composition (with or without the addition of one or more pH regulating components) may be effective to form a resultant solution achieving a target pH threshold and/or be within a target pH range. For example, when the solid composition is dissolved at a concentration of 2 wt % (dividing the weight of the solid composition in the solution by the combined weight of the solid composition and water forming the solution), the pH of the resultant solution may be at least 0.5, such as at least 1.0, at least 1.5, at least 2.0, at least 2.5, at least 3.0, at least 3.5, at least 4.0, or at least 4.5. Additional or alternatively, the pH of the resultant solution may be less than 6.0, such as less than 5.0, less than 4.5, less than 4.0, less than 3.5, less than 3.0, or less than 2.5. In some examples, the pH of the resultant solution is within a range from about 1.0 to about 5.0, such as from about 1.5 to about 4.5, from about 2.0 to about 4.0, from about 2.0 to about 3.0, or from about 3.0 to about 4.0. While the foregoing pH values are discussed at a specific example concentration of 2 wt %, the solid water treatment composition can be used at other concentration levels in practice without departing from the scope of the disclosure.

The amount of one or more pH regulating component included in the solid water treatment composition (when used) may vary depending on the pH generated by the other constituent components of the composition and the target pH threshold and/or target pH range. In some examples, the pH regulating component of the composition is present in an amount ranging from about 5 wt % to about 30 wt %, such as from about 5 wt % to about 15 wt %, from about 8 wt % to about 12 wt %, from about 12.5 wt % to about 17.5 wt %, or from about 20 wt % to about 30 wt % of the water treatment composition based on the total weight of the water treatment composition.

The solid, non-phosphorous water treatment composition can include various other optional additives. As one example, the composition may include a biocide. The water treatment composition can have less than 1 wt % biocide, such as less than about 0.5 wt %, or less than about 0.2 wt %, such as from about 0.01 wt % to about 0.2 wt % of the water treatment composition based on the total weight of the water treatment composition. Suitable biocides can include, but are not limited to, oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., 2 bromo-2 nitropropane-3-diol (Bronopol) and 2 2 dibromo-3-nitrilopropionamide (DBNPA)), and sulfur compounds (e.g., isothiazolone, carbamates, and metronidazole). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

As another example, the solid, non-phosphorous water treatment composition may include a surfactant. The composition may include from about 0.1 to 10 wt. %, from about 0.5 to 5 wt. %, or from about 0.5 to 4 wt. % of a surfactant, based on total weight of the composition. Suitable surfactants include, but are not limited to, anionic surfactants and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Nonionic surfactants include alcohol alkoxylates, alkylphenol alkoxylates, block copolymers of ethylene, propylene and butylene oxides, alkyl dimethyl amine oxides, alkyl-bis(2 hydroxyethyl) amine oxides, alkyl amidopropyl dimethyl amine oxides, alkylamidopropyl-bis(2 hydroxyethyl) amine oxides, alkyl polyglucosides, polyalkoxylated glycerides, sorbitan esters and polyalkoxylated sorbitan esters, and alkoyl polyethylene glycol esters and diesters. In other examples, the composition does not include a surfactant.

As another example, the solid, non-phosphorous water treatment composition may include a filler and/or binding agent. Example fillers and/or binding agents that may be used include a hydrated chelating agent, such as a hydrated aminocarboxylate, a hydrated polycarboxylate or hydrated anionic polymer, a hydrated citrate salt or a hydrated tartrate salt, or the like together with an alkali metal carbonate. For instance, example fillers that may be used include sodium sulfate, sodium chloride, silicate, starch, sugars, C1-C10 alkylene glycols such as propylene glycol, and the like. Example binding agents that may be used include a carbonate salt, an organic acetate, such as an aminocarboxylate, and the like. In other examples, the composition does not include a separate filler and/or binding agent.

Table 1 below provides example constituent components that may be used to formulate an example solid, non-phosphorous water treatment composition according to the disclosure. The table includes example molecules, one or more of which can be used for each composition component, along with example weight ranges for each component in the composition. The composition may comprise, consist essentially of, or consist the components and/or chemicals in the table.

erated materials in appropriate pelletizing equipment to result in appropriately sized pelletized materials. Solid block and cast solid block materials can be made by introducing into a container either a pre-hardened block of material or a castable liquid that hardens into a solid block within a container. Example containers include disposable plastic containers or water-soluble film containers. Other suitable packaging for the composition includes flexible bags, packets, shrink wrap, and water-soluble film such as polyvinyl alcohol.

The solid, non-phosphorous water treatment composition may be formed using a batch or continuous mixing system. In an example, a single- or twin-screw extruder is used to combine and mix one or more components at high shear to form a homogeneous mixture. In some embodiments, the processing temperature is at or below the melting temperature of the components. The processed mixture may be dispensed from the mixer by forming, casting or other suitable means, whereupon the composition hardens to a solid form. The structure of the matrix may be characterized according to its hardness, melting point, material distribution, crystal structure, and other like properties according to known methods in the art. Generally, a solid composition processed according to the disclosure is substantially homogeneous with regard to the distribution of ingredients throughout its mass and is dimensionally stable.

TABLE 1

| Composition Component | Example Chemical for Component | Example Amount of Ingredient (wt % based on weight of composition) |
|---|---|---|
| polycarboxylic acid | Polyaspartic acid (PASP); Copolymer of maleic and acrylic Acid (MA/AA); Butanetetracarboxylic acid; Hydrolyzed polymaleic anhydride (HPMA); Polyacrylic acid (PAA) | 25-70 wt %, such as from 30-60 wt %, from 30-40 wt %, from 40-50 wt %, or from 50-60 wt % |
| polymeric dispersant | Copolymer of acrylic acid and 2-acrylanmido-2-methylpropanesulfonic acid (AA-AMPS) sodium salt; Polyepoxysuccinic acid sodium; Copolymer of Maleic and Acrylic Acid (MA/AA) | 10-40 wt %, such as from 15-30 wt %, from 15-20 wt %, or from 20-30 wt % |
| soluble corrosion inhibitor | Zinc chloride; Zinc sulfate heptahydrate; Sodium molybdate; Benzotriazole; Tolyltriazole; Sulfamic Acid; Sodium bisulfate | 2-25 wt %, such as from 8-25 wt %, from 10-20 wt %, from 10-15 wt %, from 12.5-17.5 wt %, or from 15-20 wt % |
| pH regulator | Citric acid anhydrate; Sodium sulfate; Sodium carbonate; Sulfamic acid | 5-30 wt %, such as from 5-15 wt %, from 8-12 wt %, from 12.5-17.5 wt %, or from 20-30 wt % |
| fluorescent tracer | 1,3,6,8-Pyrenetetrasulfonic acid tetrasodium salt | 0.1-1 wt %, such as from 0.2-0.8 wt % |
| biocide | Methylisothiazolinone; Methylchloroisothiazolinone; Glutaraldehyde | Less than 0.5 wt %, such as less than 0.2 wt %, or from 0.01-0.2 wt % |

The individual constituent components of the solid, non-phosphorous water treatment composition according to the disclosure can be combined and formed into a solid structure, such as a solid block. The solid can be formed through various techniques such as pressing, casting, and/or extrusion. The constituent components may be obtained in liquid form and/or may be obtained in liquid form and dried (e.g., via spray drying, drum drying, oven drying, or other drying method to convert the liquid component to a solid to powders)

The solid, non-phosphorous water treatment composition may be made by blending the dry constituent ingredients in appropriate ratios or agglomerating the materials in appropriate agglomeration systems. Pelletized materials can be manufactured by compressing the solid granular or agglom- In an extrusion process, one or more liquid and/or solid components are introduced into a final mixing system and are continuously mixed until the components form a substantially homogeneous semi-solid mixture in which the components are distributed throughout its mass. The mixture is then discharged from the mixing system into, or through, a die or other shaping means. The product is then packaged.

In a casting process, one or more liquid and/or solid components are introduced into a final mixing system and are continuously mixed until the components form a substantially homogeneous liquid mixture in which the components are distributed throughout its mass. Once the mixing is complete, the product is transferred to a packaging container where solidification takes place.

In a pressed solid process, a flowable solid, such as granular solids or other particle solids are combined under pressure. In a pressed solid process, flowable solids of the compositions are placed into a form (e.g., a mold or container). The method can include gently pressing the flowable solid in the form to produce the non-phosphorous water treatment composition. Pressure may be applied by a block machine or a turntable press, or the like. Pressure may be applied at about 1 to about 2000 psi, about 1 to about 300 psi, about 5 psi to about 200 psi, or about 10 psi to about 100 psi. In certain embodiments, the methods can employ pressures as low as greater than or equal to about 1 psi, greater than or equal to about 2, greater than or equal to about 5 psi, or greater than or equal to about 10 psi. As used herein, the term "psi" or "pounds per square inch" refers to the actual pressure applied to the flowable solid being pressed and does not refer to the gauge or hydraulic pressure measured at a point in the apparatus doing the pressing. The method can include a curing step to produce the solid, non-phosphorous water treatment composition. As referred to herein, an uncured composition including the flowable solid is compressed to provide sufficient surface contact between particles making up the flowable solid that the uncured composition will solidify into a stable composition. A sufficient quantity of particles (e.g. granules) in contact with one another provides binding of particles to one another effective for making a stable solid composition. Inclusion of a curing step may include allowing the pressed solid to solidify for a period of time, such as a few hours, or about 1 day (or longer). In additional aspects, the methods could include vibrating the flowable solid in the form or mold.

By the term "solid", it is meant that the hardened composition will not flow and will substantially retain its shape under moderate stress or pressure or mere gravity. A solid may be in various forms such as a powder, a flake, a granule, a pellet, a tablet, a lozenge, a puck, a briquette, a brick, a solid block, a unit dose, or another solid form known to those of skill in the art. The degree of hardness of the solid cast composition and/or a pressed solid composition may range from that of a fused solid product which is relatively dense and hard, for example, like concrete, to a consistency characterized as being a hardened paste.

In addition, the term "solid" refers to the state of the composition under the expected conditions of storage and use of the solid composition. A solid composition according to the disclosure can remain dimensionally stable under elevated temperature and humidity storage conditions. For example, the solid composition can remain dimensionally stable at a temperature of 50 degrees Celsius and 70% relative humidity for a period of at least one month, such as at least two months, at least 6 months, or at least one year (e.g., a period from one month to one year). The term "dimensionally stable" means that the solid composition does not change size in any measured dimension by more than 1% when exposed to the noted environmental conditions outside of packaging protection for the subject period.

The resulting solid, non-phosphorous water treatment composition may take forms including, but not limited to: a cast solid product; an extruded, molded or formed solid pellet, block, tablet, powder, granule, flake; pressed solid; or the formed solid can thereafter be ground or formed into a powder, granule, or flake. In some examples, the water treatment composition is formed into a solid having a weight of at least 10 grams, such as at least 100 grams, at least 1 kg, or at least 10 kg. For example, the composition may be formed into a solid having a mass from 1 to 100 kilograms, such as from 1 to 25 kg.

The solid compositions can provide for a stabilized source of functional materials. In some embodiments, the solid composition may be dissolved, for example, in an aqueous medium, to create a concentrated solution. The solution may be directed to a storage reservoir for later use and/or dilution, or may be applied directly to a point of use. For example, in a cooling water application, the solid, non-phosphorous treatment composition may be dissolved to form a concentrated solution. The amount of the solid composition dissolved in the water may be effective to generate a concentrated solution having a concentration ranging from 0.1 wt % to 5 wt % of the treatment composition based on the combined weight of the water and treatment composition to about 1 wt % to about 3 wt %. In many applications, the actual size of the sump may range from a few liters (e.g., 2 to 4 liters) to about 20 liters, although other size applications are also possible.

The solid, non-phosphorous water treatment composition can substantially completely dissolve in the water to which the composition is added. The example the composition may exhibit about 100% solubility in the water in which it is added. The composition may dissolve in the water to which the solid composition is added over a time period 1 hour or less, such as 30 minutes or less, 15 minutes or less, 10 minutes or less, 5 minutes or less, 2 minutes or less, 1 minute or less, 30 seconds or less, 20 seconds or less, 10 seconds or less, or 5 seconds or less. The water to which the solid composition is added may optionally be mixed to aid and accelerate dissolution. The temperature of the water to which the composition is added may vary and, in some examples, may be in a range from 20 degrees Celsius to 80 degrees Celsius, such as from 20 to 30 degrees Celsius, from 30 to 40 degrees Celsius, from 40 to 50 degrees Celsius, from 50 to 60 degrees Celsius, from 60 to 70 degrees Celsius, or from 70 to 80 degrees Celsius.

The solid, non-phosphorous water treatment composition disclosed herein can be used in water containing system, such as desalination systems, cooling systems (e.g., cooling towers, radiators, heat pipes, etc.), pipes, drilling equipment (e.g., drill strings, drilling mud, etc.), tracking and fracking equipment, paper or pulp processing systems, wastewater treatment systems, water purification systems, ware washing, evaporators, condensers, filtration, mining, water softening, pumps, storage vessels, or any other systems using water sources or that contact one or more surfaces therein. During use, as the scale and/or forming and/or corrosion promoting content of the water sources concentrate (e.g., through evaporation) and/or thermal shock occurs, corrosive conditions intensify, corrosion initiates, and scale deposits on the surfaces of water containing systems from the water sources in contact therewith. Such surfaces may include the interior of pipes, storage vessels, radiators, heat pipes, filters, digesters, condensers, the exterior of cooling towers, or any other surface that contacts a water source. The surfaces of the water containing systems may include metals, plastics, glass, rubber or latex, fiberglass, concrete or stone, or any other material suitable to hold, transport, or filter water.

The surfaces of the water containing systems treated with a solid, non-phosphorous water treatment composition disclosed herein may include metals, such as iron, steel (e.g., stainless steel, carbon steel, or galvanized steel), copper, lead, zinc (e.g., anodized pipes), aluminum, or any other metal suitable for use in water containing systems; plastics, such as polyethylene (e.g., PEX), polypropylene, polytetrafluoroethylene, polyvinyl chlorides, acrylonitrile butadiene styrene, etc.; glass (e.g., glass storage vessels), rubber or latex (rubber hoses or tubes); fiberglass; concrete or stone; or any other material suitable to hold, transport, or filter water. The term "carbon steel" means steel in which the main alloying component with iron is carbon, wherein the carbon steel comprises between about 0.1% to about 2.1% by weight of carbon.

The water source to be treated using a composition as disclosed herein may include one or more corrodents/scale-forming agents therein, wherein the one or more corrodents/scale-forming agents comprises, consists essentially of, or consists of carbon dioxide, hydrogen sulfide, organosulfur compounds, metal cations, metal complexes such as aqueous metal cations, metal chelates and/or organometallic complexes, aluminum ions, ammonium ions, barium ions, chromium ions, cobalt ions, cuprous ions, cupric ions, calcium ions, ferrous ions, ferric ions, hydrogen ions, lead ions, magnesium ions, manganese ions, molybdenum ions, nickel ions, potassium ions, sodium ions, strontium ions, titanium ions, uranium ions, vanadium ions, zinc ions, bromide ions, carbonate ions, chlorate ions, chloride ions, chlorite ions, dithionate ions, fluoride ions, hypochlorite ions, iodide ions, nitrate ions, nitrite ions, oxide ions, perchlorate ions, peroxide ions, phosphate ions, phosphite ions, sulfate ions, sulfide ions, sulfite ions, hydrogen carbonate ions, hydrogen phosphate ions, hydrogen phosphite ions, hydrogen sulfate ions, hydrogen sulfite ions, carbonic acid, hydrochloric acid, nitric acid, sulfuric acid, nitrous acid, sulfurous acid, peroxy acids, phosphoric acid, ammonia, bromine, carbon dioxide, chlorine, chlorine dioxide, fluorine, hydrogen chloride, hydrogen sulfide, iodine, nitrogen dioxide, nitrogen monoxide, oxygen, ozone, sulfur dioxide, hydrogen peroxide, polysaccharide, or combinations thereof. Each corrodent/scale-forming agent or the total amount of one or more corrodents/scale-forming agents in the water source may be present in a concentration of at least about 10 ppm, such as at least about 50 ppm, at least about 100 ppm, at least about 300 ppm, at least about 500 ppm, at least about 1000 ppm, at least about 2000 ppm, at least about 5000 ppm, at least about 10,000 ppm, at least about 20,000 ppm, or less than about 100,000 ppm.

The solid, non-phosphorous water treatment composition disclosed herein may inhibit corrosion, such as corrosion caused by contact of a surface with a water source containing corrodents or corrosive conditions which may cause corrosion. The solid, non-phosphorous water treatment composition disclosed herein may also inhibit formation of scale such as scale formed from calcium carbonate; magnesium carbonate; calcium sulfate; barium sulfate; barium carbonate; calcium fluoride; silicates of calcium, magnesium, aluminum, or iron; etc.; or any other scales known to form in aqueous systems. The solid, non-phosphorous water treatment composition disclosed before these functions without the use of phosphorous or phosphorous containing compounds (e.g., phosphates).

In some applications, the pH of the water source is between 7 and 14, such as between about 7 and about 10, between about 10 and 14, between about 9 and about 11, between about 7 and about 9, or between about 7 and about 8. In some other applications, the pH of the water source is between 0 and 7, such as between about 1 and about 6, between 5 and 6, between 4 and 5, between 3 and 4, between 2 and 3, or 1 and 2.

In some implementations, the source water in which the solid, non-phosphorous water treatment composition is used is a cooling system including one or more of a water jacket, radiators, pipes, heat pipes, pumps, a cooling tower, etc. As the water source circulates through the water containing system and is evaporated on one or more portions thereof, the total dissolved solids content gradually concentrates with each cycle through the system. The corrosive/scaling materials therein may reach a concentration where they begin to corrode and/or scale the surfaces in contact therewith, if left untreated. A solid, non-phosphorous water treatment composition may be added to the source water to inhibit or prevent corrosion (e.g., pitting or oxidation) and/or scaling caused by the make-up (e.g., pH and/or dissolved solids) of the water source.

The water source and non-phosphorous water treatment composition added thereto may be maintained in a closed system or an open system, augmented with additional water from outside the system (e.g., make-up water), and/or may be circulated out of the system (e.g., blow-down water) and replaced with additional water and/or non-phosphorous water treatment composition from outside the system. Such maintenance, augmentation, and removal of the water source and/or water treatment composition allows a user to selectively control the concentration of composition in the water source and/or amount or rate of corrosion or scaling in the water containing system.

In an application, a method of inhibiting corrosion and scale includes dispensing a solid, non-phosphorous water treatment composition, such as any of those disclosed herein. The method may include providing a water source, such as any water source disclosed herein. The method includes dispensing the solid, non-phosphorous water treatment composition in the water source. In some examples, the solid, non-phosphorous water treatment composition is size reduced by use of a grinder or other mechanical device to reduce a larger solid block into a power or small solid block, increasing the surface area of the solid for dissolution. In either case, the solid composition can be mixed with the source water, e.g., by placing the solid in the source water and/or spraying the source water on the solid. The combination of the composition and source water may be mixed. Mixing may include one or more of batch wise, continuous, or incremental (e.g., supplemental, on-demand, or monitored) additions.

The solid, non-phosphorous water treatment composition may be used at a variety of concentration levels in the water source, such as at a concentration of about 0.05 ppm to about 1000 ppm (e.g., 0.05 ppm to about 50 ppm) of the water treatment composition, such as about 0.05 ppm to about 10 ppm, about 0.05 ppm to about 3 ppm, about 0.05 ppm to about 5 ppm, about 1 ppm to about 5 ppm, about 2 ppm to about 10 ppm, about 5 ppm to about 20 ppm, about 15 ppm to about 30 ppm, about 20 ppm to about 40 ppm, about 30 ppm to about 50 ppm, about 50 ppm to about 100 ppm, about 1 ppm to about 30 ppm, about 10 ppm to about 100 ppm, about 50 ppm to about 500 ppm, about 100 ppm to about 1000 ppm, less than about 1000 ppm, less than about 500 ppm, less than about 100 ppm, less than about 30 ppm, less than about 10 ppm, or less than about 5 ppm.

The method may include circulating the treatment composition and water through the water containing system, such as any water containing system or component thereof disclosed herein. For example, the mixture may be circulated through a water jacket or piping. In an embodiment, the method includes recirculating the mixture through the water containing system and selectively augmenting the treatment composition content and/or water in the system to maintain, decrease, or increase the concentration of the treatment composition. The concentration of the treatment composition may be monitored, during use, by use of a fluorescent agent and equipment (e.g., fluorometer) to determine the concentration in the water source.

The following example may provide additional details about compositions and techniques according to the disclosure.

EXAMPLE

A series of solid, non-phosphorous water treatment compositions were made that includes N-(2-Hydroxypropyl) methacrylamide (HPMA), a tagged high stress polymer (tHSP2) commercially available from Nalco Water, an Ecolab Company, benzotriazole, and zinc chloride. A composition was dissolved in water at a concentration of 3 wt %. The composition was dissolved in water at a high pH. The pH was incrementally adjusted from a pH of 10 down to a pH of 2. The results of the parametric pH tested showed a turbid solution when the pH was above about 6, indicating incompatibility between components of the composition and/or incomplete dissolution. Starting at about pH 6 and lower, the solution cleared, indicating complete dissolution of the components for good corrosion/scale control performance.

The invention claimed is:

1. A solid, non-phosphorus water treatment composition for cooling water treatment, the composition comprising:

(a) a polycarboxylic acid ranging from 30 weight percent to 60 weight percent of the composition;

(b) a polymeric dispersant ranging from 15 weight percent to 30 weight percent of the composition;

(c) a soluble corrosion inhibitor ranging from 2 weight percent to 25 weight percent of the composition;

(d) a fluorescent tracer; and (e) an anhydrous pH regulator;

wherein the composition:

(i) defines a solid;

(ii) is devoid of phosphorus; and (iii) has a pH effective such that, when the composition is dissolved in water at a concentration of 2 weight percent to form a solution, the solution has a pH within a range from 1 to 5.

2. The composition of claim 1, wherein the composition exhibits about 100% solubility in water and is dimensionally stable at a temperature of 50 degrees Celsius and 70% relative humidity for a period of at least one month.

3. The composition of claim 1, wherein the polycarboxylic acid, the polymeric dispersant, the soluble corrosion inhibitor, and the fluorescent tracer are each substantially uniformly dispersed across an entire cross-section of the solid.

4. The composition of claim 1, wherein the anhydrous pH regulator comprises from 5 weight percent to 30 weight percent of the composition.

5. The composition of claim 1, wherein the anhydrous pH regulator comprises an alkali metal salt.

6. The composition of claim 1, wherein the composition has a pH effective such that, when the composition is dissolved in water at a concentration of 2 weight percent to form the solution, the solution has a pH within a range from 2.5 to 4.

7. The composition of claim 1, wherein the soluble corrosion inhibitor comprises at least one of a zinc-containing compound, a molybdate-containing compound, and a triazole.

8. The composition of claim 1, wherein soluble corrosion inhibitor comprises a triazole ranging from 2 weight percent to 15 weight percent of the composition and at least one of a zinc-containing compound and a molybdate-containing compound ranging from 2 weight percent to 15 weight percent of the composition.

9. The composition of claim 1, wherein the solid comprises a pressed solid.

10. The composition of claim 1, wherein the polycarboxylic acid is selected from the group consisting of polyaspartic acid (PASP), a copolymer of maleic and acrylic acid (MA/AA), butanetetracarboxylic acid, hydrolyzed polymaleic anhydride (HPMA), polyacrylic acid (PAA), and combinations thereof.

11. The composition of claim 1, wherein the composition further comprises a biocide.

12. The composition of claim 11, wherein the biocide ranges from 0.01 wt % to 0.2 wt % of the composition.

13. A solid, non-phosphorus water treatment composition for cooling water treatment, the composition comprising:

(a) a polycarboxylic acid ranging from 30 weight percent to 60 weight percent of the composition;

(b) a polymeric dispersant ranging from 15 weight percent to 30 weight percent of the composition;

(c) a soluble corrosion inhibitor ranging from 2 weight percent to 25 weight percent of the composition;

(d) a fluorescent tracer; and (e) an anhydrous pH regulator, wherein the composition:

(i) defines a pressed solid;

(ii) is devoid of phosphorus;

(iii) has a pH effective such that, when the composition is dissolved in water at a concentration of 2 weight percent to form a solution, the solution has a pH within a range from 2.5 to 4; and (iv) has a substantially uniform distribution of constituent components across (iv) an entirety of the composition.

14. The composition of claim 13, wherein the anhydrous pH regulator comprises from 5 weight percent to 30 weight percent of the composition.

15. The composition of claim 13, wherein the composition exhibits about 100% solubility in water and is dimensionally stable at a temperature of 50 degrees Celsius and 70% relative humidity for a period of at least one month.

16. The composition of claim 13, wherein:

the polycarboxylic acid is selected from the group consisting of polyaspartic acid (PASP), a copolymer of maleic and acrylic acid (MA/AA), butanetetracarboxylic acid, hydrolyzed polymaleic anhydride (HPMA), polyacrylic acid (PAA), and combinations thereof;

the polymeric dispersant is selected from the group consisting of a copolymer of acrylic acid and 2-acrylanmido-2-methylpropanesulfonic acid (AA-AMPS) sodium salt; polyepoxysuccinic acid sodium; and a copolymer of Maleic and Acrylic Acid (MA/AA); and the soluble corrosion inhibitor comprises at least one of a zinc-containing compound, a molybdate-containing compound, and a triazole.

17. A method of treating a cooling water system, the method comprising:

adding a solid, non-phosphorus water treatment composition to a water source to form a solution, the solid, non-phosphorus water treatment composition comprising a polycarboxylic acid ranging from 30 weight percent to 60 weight percent of the composition, a polymeric dispersant ranging from 15 weight percent to 30 weight percent of the composition, a soluble corrosion inhibitor ranging from 2 weight percent to 25 weight percent of the composition, a fluorescent tracer, and an anhydrous pH regulator, wherein forming the solution comprises forming a solution having a pH within a range from 1 to 5; and applying the solution within a water containing system.

18. The method of claim 17, wherein adding the solid, non-phosphorus water treatment composition to the water source to form the solution comprises forming the solution in a sump, and applying the solution within the water containing system comprises distributing the solution from the sump to the water containing system.

19. The method of claim 17, wherein the water containing system includes one or more of a cooling tower, a radiator, one or more pipes, a water jacket, a desalination membrane, a condenser, an evaporator, a pump, or a storage vessel.

20. The method of claim 17, wherein applying the solution within the water containing system comprises recirculating water in the water containing system.

21. The method of claim 17, wherein the anhydrous pH regulator comprises from 5 weight percent to 30 weight percent of the composition.

22. The method of claim 17, wherein:

the polycarboxylic acid is selected from the group consisting of polyaspartic acid (PASP), a copolymer of maleic and acrylic acid (MA/AA), butanetetracarboxylic acid, hydrolyzed polymaleic anhydride (HPMA), polyacrylic acid (PAA), and combinations thereof;

the polymeric dispersant is selected from the group consisting of a copolymer of acrylic acid and 2-acrylanmido-2-methylpropanesulfonic acid (AA-AMPS) sodium salt; polyepoxysuccinic acid sodium; and a copolymer of Maleic and Acrylic Acid (MA/AA); and the soluble corrosion inhibitor comprises at least one of a zinc-containing compound, a molybdate-containing compound, and a triazole.

* * * * *